Dec. 5, 1967 R. P. BURR 3,356,877
ELECTROMECHANICAL ENERGY CONVERTER OF THE DOUBLE AIR GAP TYPE
Original Filed Feb. 20, 1963 5 Sheets-Sheet 2
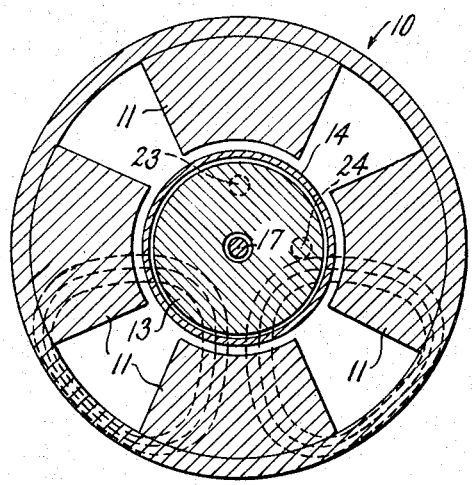
_Fig. 2_
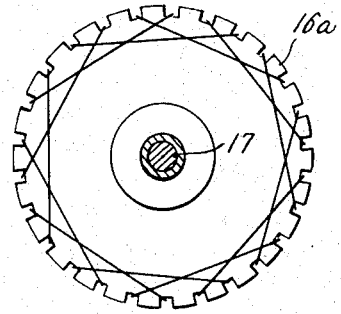
_Fig. 4_
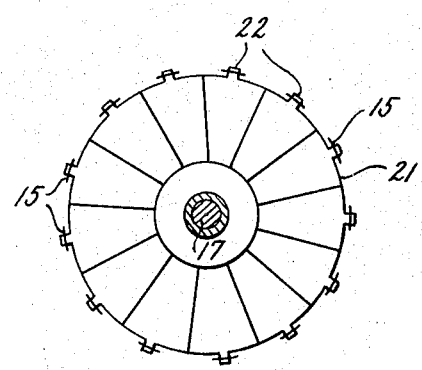
_Fig. 5_
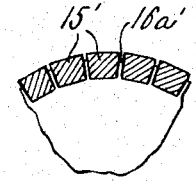
_Fig. 4a_
INVENTOR.
ROBERT P. BURR
BY Charles A. Blank
ATTORNEY

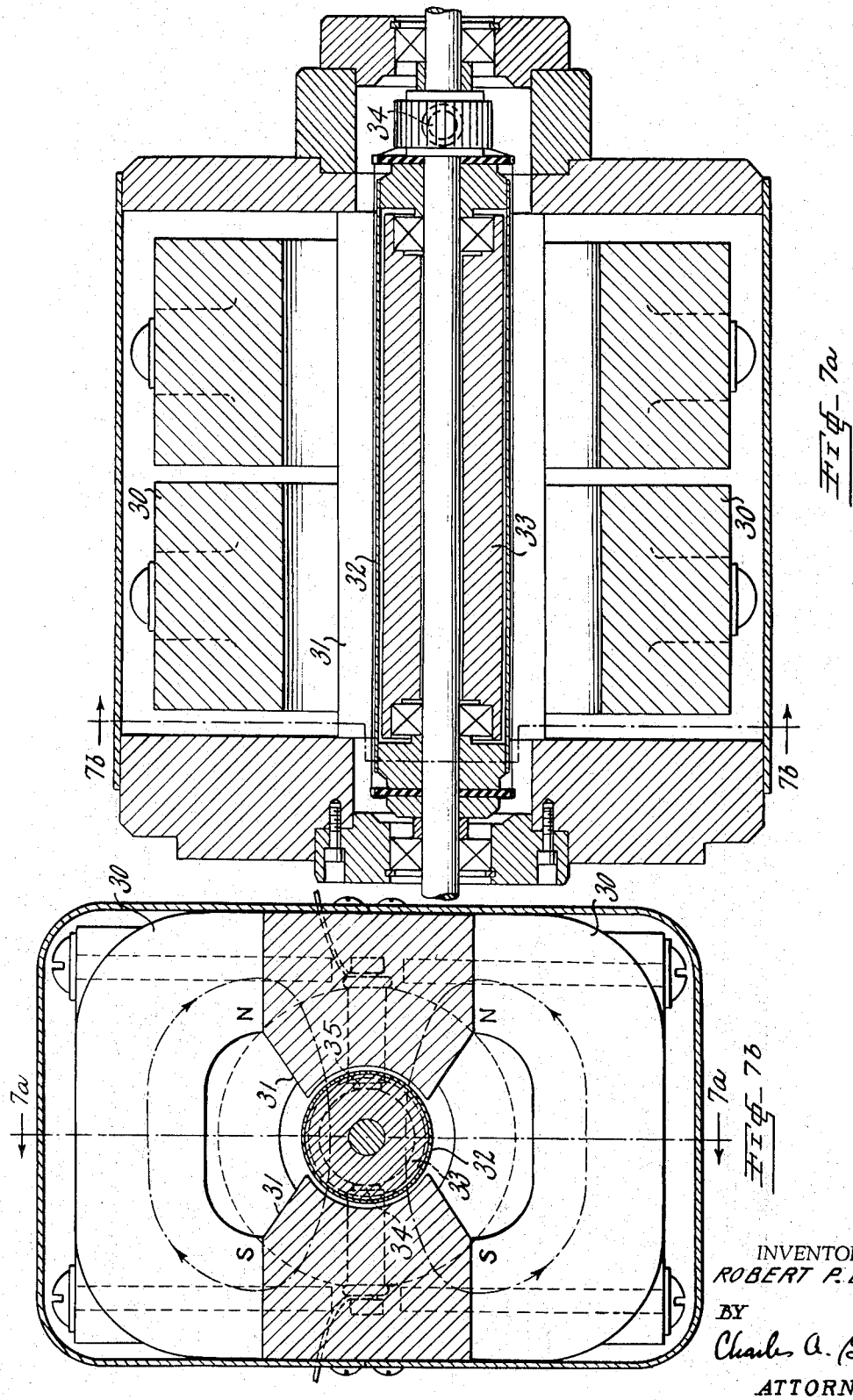

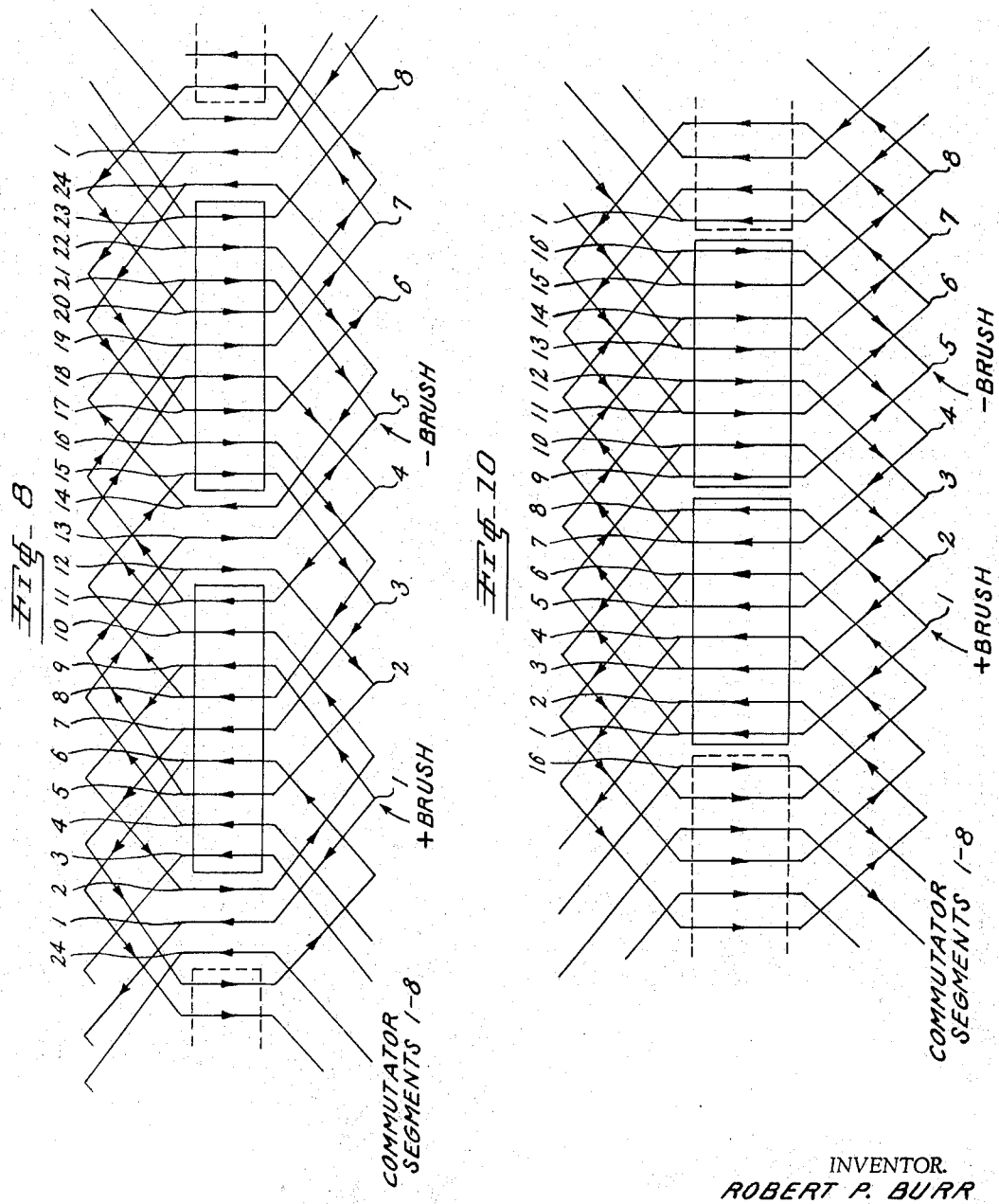

United States Patent Office 3,356,877
Patented Dec. 5, 1967

3,356,877
ELECTROMECHANICAL ENERGY CONVERTER OF THE DOUBLE AIR GAP TYPE
Robert P. Burr, Huntington, N.Y., assignor to Circuit Research Company, Glen Cove, N.Y., a partnership of New York
Continuation of application Ser. No. 259,848, Feb. 20, 1963. This application Feb. 16, 1966, Ser. No. 533,762
10 Claims. (Cl. 310—266)

This invention relates to electromechanical energy converters and, more particularly, to direct-current cylindrical motors.

This application is a continuation of the copending application Ser. No. 259,848 filed Feb. 20, 1963, and entitled, Electromechanical Energy Converter, now abandoned.

Prior direct-current motors have, in general, been subject to one or more of the following limitations. The motors tend to "cog" or operate with momentary speed variations at given armature positions. The motors have higher inertia and longer mechanical time constant characteristics than may be desirable for many applications. The mechanical time constant of a motor is the time required for the motor and connected load, if any, to reach 63% of their final angular velocity when the motor is suddenly connected to a constant voltage source of zero internal impedance. Some prior motors have high electrical inductance; some motors have high and variable brush friction. Other motors develop hot spots due to poor heat transfer characteristics. Some motors are easily magnetized by large impulse currents.

It is an object of the present invention, therefore, to provide a new and improved electromechanical energy converter which avoids one or more of the foregoing limitations.

It is another object of the invention to provide a new and improved direct-current cylindrical motor which is free from cogging and has an extremely short mechanical time constant, for example, .004 second.

It is another object of the invention to provide a new and improved direct-current cylindrical motor which is not subject to hot spots.

It is another object of the invention to provide a new and improved direct-current electrical motor which has negligible electrical inductance.

It is another object of the invention to provide a new and improved direct-current cylindrical motor which resists magnetization by large impulse currents.

It is another object of the invention to provide a new and improved direct-current cylindrical motor having minimum and constant brush friction.

In accordance with the invention, an electromechanical energy converter comprises means for developing a magnetic field and rotatable hollow armature means disposed in the magnetic field and comprising a winding distributed substantially uniformly over the armature means. The field-developing means includes a member mounted within the armature means and rotatable with respect to the armature means. The converter includes commutator means coupled to the armature winding for translating current with respect to the armature winding.

For a better understanding of the present invention, together with other and further objects thereof, reference is made to the following description, taken in connection with the accompanying drawings, and its scope will be pointed out in the appended claims.

Referring now to the drawings:

FIG. 2 is a sectional view of the motor, to a reduced scale, taken along line 2—2 of FIG. 1;

FIG. 3 is a plan view of the armature of the FIG. 1, motor, taken along line 3—3 of FIG. 1, showing winding schematically;

FIG. 4 is a fragmentary sectional view of the armature of the FIG. 1 motor, taken along line 4—4 of FIG. 1;

FIG. 4a is a fragmentary sectional view of another suitable hub end plate;

FIG. 5 is a fragmentary sectional view of the armature to show the commutator thereof, taken along line 5—5 of FIG. 1;

FIGS. 7a, 7b are sectional views of another motor constructed in accordance with the invention; and FIGS. 8–10, inclusive, are diagrams of various winding patterns as examples suitable for motors constructed in accordance with the invention.

Figure 1:
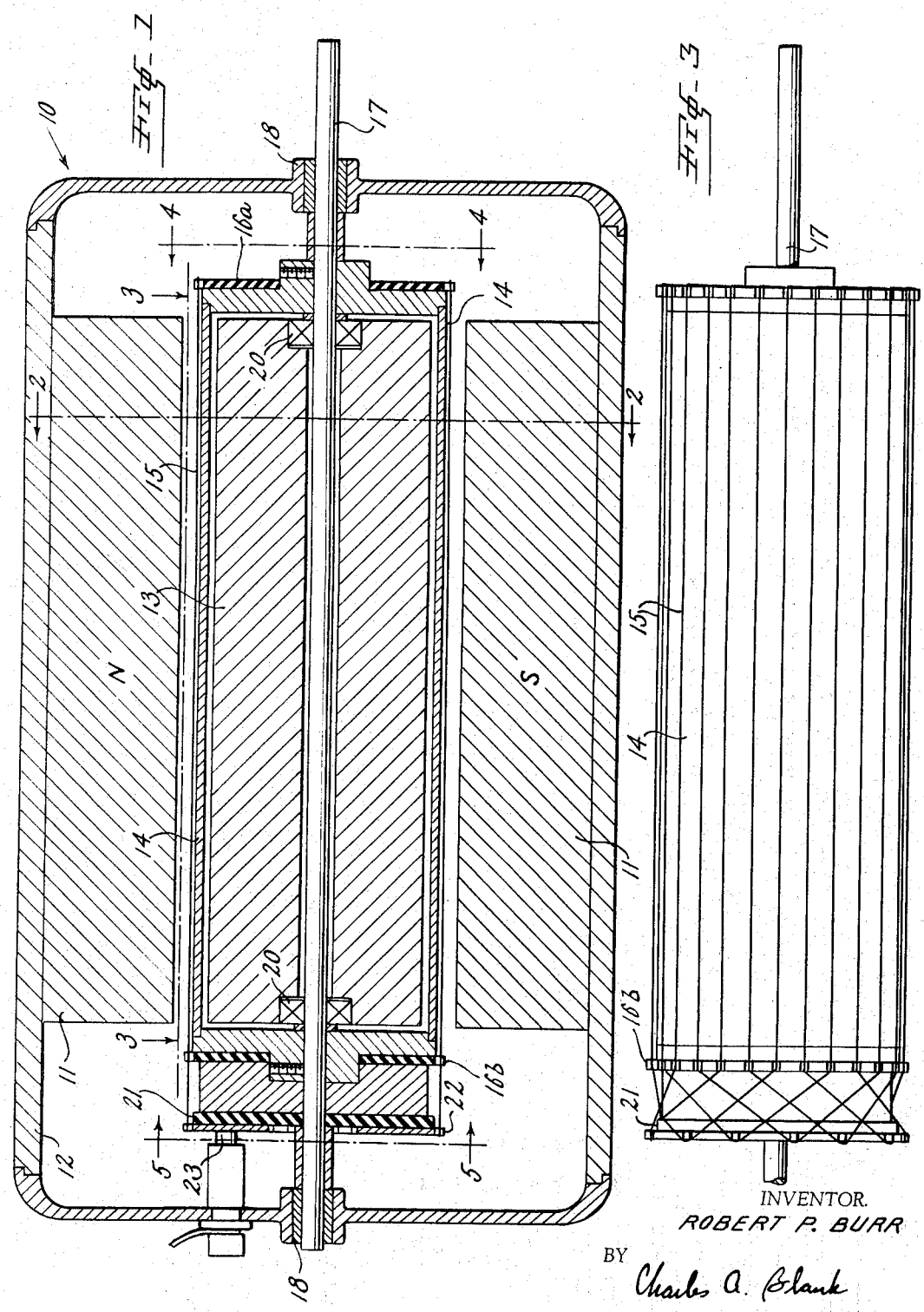
FIG. 1 is a view, in section, of a motor constructed in accordance with the invention.

Referring now more particularly to FIGS. 1 and 2 of the drawings, an electromechanical energy converter constructed in accordance with the invention preferably is a direct-current motor 10 comprising means for developing a magnetic field. The field-developing means may, for example, include four permanent magnets 11 mounted on a suitable annulus 12 of ferromagnetic material providing a flux return path and forming a portion of the motor housing. The magnets 11 may also be wound electromagnets. The field-developing means also includes a member 13 which will be more fully described subsequently.

The motor 10 also includes rotatable hollow armature means disposed in the magnetic field and comprising a winding distributed substantially uniformly over the surface of the armature means. More particularly, the armature means is a substantially cylindrical shell 14 having an armature winding 15 extending longitudinally of the shell and distributed substantially uniformly over the shell, as represented in FIGS. 1 and 3. The cylindrical shell 14 is supported on a shaft 17 by hubs 16a, 16b of suitable insulating material, and the shaft is rotatably mounted on bearings 18 in the motor housing. The shell 14 may be of suitable insulating material, or the shell 14 may be of conductive, non-ferromagnetic material if eddy-current damping is desired.

The member 13 preferably is a low-reluctance core of homogeneous ferromagnetic material. The core 13 is mounted on bearings 20 on the shaft 17 within the armature shell 14 and thus is rotatable with respect to the armature shell 14 and with respect to the shaft 17. The core 13 may include one or more notches in its outer periphery or may be mounted with suitable detents to establish a preferred core position relative to the magnets 11.

The motor 10 also includes commutator means coupled to the armature winding for translating current with respect to the armature winding. More particularly, the commutator means comprises an end plate 21 having radially extending conductive members with conductive tabs 22, as represented in FIG. 5. The commutator means also includes suitable brushes 23, 24 represented diagrammatically in FIGS. 1 and 2 and positioned, for example, with 90° spacing to supply current to the commutator 21.

Referring to FIGS. 1, 4 and 5, the armature winding preferably comprises a conductive wire 15 disposed between selected insulating tabs of the hub end plate 16a and the hub 16b and conductively connected to selected conductive tabs of the commutator end plate 21. A suitable insulating material such as an epoxy binder maintains the winding in position along the length of the shell 14.

Figure 6:
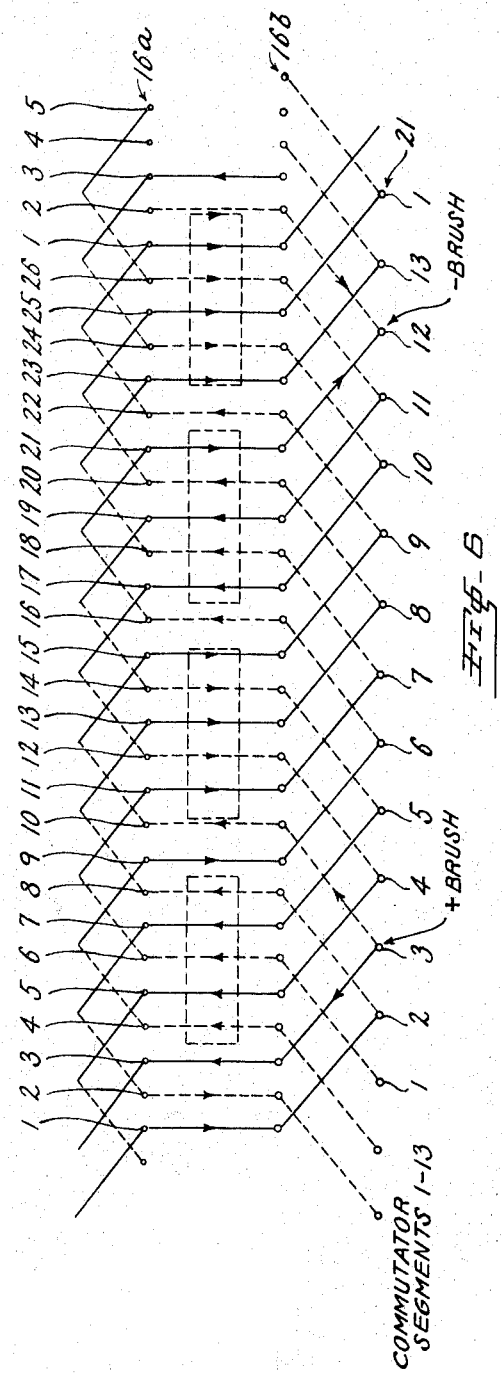
FIG. 6 is a diagram representing the winding pattern of the FIG. 1 armature.

To provide uniform cooling of the conductor portions of the winding, the winding 15 preferably is wound in a single layer in the manner represented diagrammatically in FIG. 6. The slots of the hubs 16a, 16b are represented by two rows of circles designated 16a, 16b and the tabs of the commutator are represented by the row of circles designated 21. Thus, the conductor passes along slot 1 of the hubs 16a, 16b to a commutator tab 2 facing a region between slots 4 and 5. The conductor then passes from commutator tab 2 to slot 8. Suitable insulating material separates the conductors from one another at their intersections on the hub 16a. The continuous wave winding is thereby formed. The conductors lie side by side on the surface of the armature shell and occupy substantially the entire surface preferably.

Considering now the operation of the FIG. 1 motor, the magnetic field extends from the magnets 11 across the air gap to the core 13, as represented by the broken lines of FIG. 2. Current supplied to the armature through the brushes and commutator is translated through the armature winding in a usual manner. Accordingly, the armature shell 14 rotates with shaft 17 within the housing 10. The core 13 is mounted on bearings 20, and accordingly the shaft 17 rotates within the core 13 but the core 13 remains substantially stationary. Slight rotation of the core 13 may occur but this rotation is not significant. As mentioned previously, if desired, the core may be notched longitudinally in regions corresponding to gaps between adjacent magnets 11 to eliminate all rotation of the core magnetically.

Referring now more particularly to FIGS. 7a and 7b of the drawings, there are represented sectional views of a motor constructed in accordance with the invention and generally similar to the FIG. 1 motor. The FIG. 7a motor, however, utilizes a pair of two-pole permanent horseshoe magnets 30, 30 for developing maximum flux in the region between the pole pieces 31, 31. The armature is constructed in a manner similar to the armature of the FIG. 1 motor with a hollow rotatable armature shell 32 supporting a winding connected to segments of a cylindrical commutator 40 and an inner core 33 of ferromagnetic material rotatable with respect to the armature shell.

Figure 9:
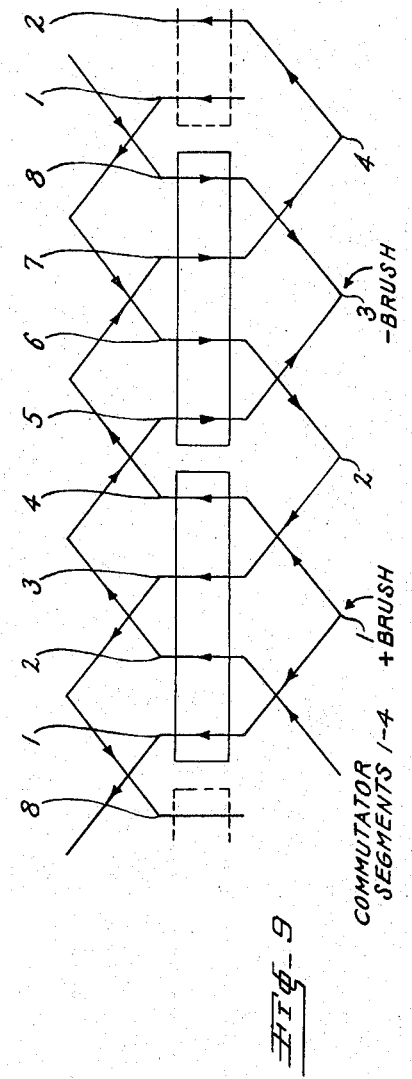

The winding of the armature may be in any suitable form, for example, as represented diagrammatically in FIGS. 8, 9 and 10. FIG. 8 represents a two pole lap winding in which all the conductors may be on the surface of the armature shell. Connections to a suitable 8-segment commutator may be made as indicated in FIG. 8. Brushes 34, 35 of FIG. 7a may be suitably positioned with 180° spacing as indicated diagrammatically in FIG. 8. FIG. 9 represents a two pole wave winding with one-half turn per pole. A suitable 4-segment commutator may be utilized, with brushes positioned as indicated. FIG. 10 represents a two-pole wave winding with one and one-half turns per pole. A suitable 8-segment commutator may be utilized, with brushes positioned as indicated.

Any of the foregoing windings may be wound on the armature shell in a thin surface layer one conductor thick, or, if preferred for particular applications, the windings may be wound in a thin layer two conductors thick with alternate conductors in a second tier uniformly distributed over the surface of the armature beneath the first tier of intervening conductors. This allows the diameter of the individual conductor portions of the winding to be increased. The conductors of each layer are substantially contiguous but electrically insulated from each other.

It will be apparent that any of the types of winding represented for the FIG. 7a motor may also be adapted for use in the FIG. 1 motor, namely, a suitable lap or wave winding of either single turn or multiple turns per pole with single or double conductor thickness. The brushes of the FIG. 7a motor may be positioned to correspond with the winding utilized. For some applications, two additional tiers of substantially uniformly distributed armature conductors may be wound over the surface of the armature beneath the first and second tiers. Thus, the thin layer in which the winding is formed may range from one to four conductors thick.

Because the armature shell has extremely low inertia, the motor has a short mechanical time constant. Moreover, because the winding is in one to four substantially uniformly distributed tiers at the surface of the armature shell, the motor does not develop hot spots. For some applications, the winding may be a printed-circuit or equivalent winding on the surface of the armature shell. For example, the winding may be plated, etched or formed by suitable copper deposition techniques.

The motor has low and constant brush friction because the brushes operate on a surface which is planar and which can be readily made uniform. A cylindrical commutator surface may also be utilized in some motors embodying the present invention, or the brushes may directly contact the wire of the winding around the circumference of the armature shell. The armature shell is free of any magnetic material, the core is of homogenous ferromagnetic material and the armature winding is distributed uniformly over the armature shell. Therefore, the armature is free of any tendency to "cog" or operate with momentary speed variations or to have preferred positions. The armature also cannot be magnetized by impulse currents because it is free of iron.

It should be understood that the representations of the conductors of FIGS. 3, 4 and 5 are schematic. The conductors physically preferably have dimensions such that the conductors almost touch one another in a side-by-side relation along the length of the armature. To this end, the conductors may, for example, be of rectangular cross-section and the hub slots may be substantially wider than the hub tabs between slots in order to contain conductors of maximum dimensions to provide maximum current-carrying capacity, as represented in FIG. 4a by hub 16a' and conductors 15'.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electromechanical energy converter comprising: a support; means mounted on said support for developing a magnetic field; rotatable hollow armature means disposed in said magnetic field and comprising an annular shell having a winding in the form of a thin layer in the range of from one to four conductors thick, said winding having turns distributed substantially uniformly over said entire annular shell, said armature means including a shaft positioned on the axis of said annular shell and means supporting said shell at each axial end thereof and fixing said shell to said shaft; said field developing means including a low reluctance core mounted within said annular shell and rotatable with respect to said armature means and with respect to said support, said core and any parts fixed thereto being entirely within said armature means; and commutator means coupled with said armature winding for translating current with respect to said armature winding.

2. An electromechanical energy converter as recited in claim 1 wherein said thin layer comprising said winding is in the range of from one to two conductors thick.

3. An electromechanical energy converter as recited in claim 1 wherein said thin layer comprising said winding is one conductor thick.

4. An electromechanical energy converter as recited in claim 3 wherein said winding occupies substantially the entire surface of said shell.

5. An electromechanical energy converter as recited in claim 1 wherein said converter is a direct current motor and wherein said annular shell is cylindrical and the conductors of said winding extend longitudinally of said shell.

6. A direct current motor as recited in claim 5 wherein said thin layer comprising said winding is in the range of from one to two conductors thick.

7. A direct current motor as recited in claim 5 wherein said thin layer comprising said winding is one conductor thick.

8. A direct current motor as recited in claim 7 wherein said winding occupies substantially the entire surface of said shell.

9. An electromechanical energy converter as recited in claim 1 wherein said converter is a direct current motor and wherein said core is homogeneous and comprises ferroelectric material.

10. A direct current motor comprising a support; magnetic means mounted on said support for developing a magnetic field; armature means rotatably mounted on said support and comprising a shaft and a substantially cylindrical shell having end plates mounted on said shaft, one of said end plates having tabs of insulating material and the other of said end plates having radially extending conductive members with conductive tabs; said armature means also including an armature winding in the form of a thin layer one conductor thick extending longitudinally of said shell and having turns distributed substantially uniformly over said entire shell, said winding being disposed between selected insulating tabs at said one end plate and being conductively connected to selected conductive tabs at said other end plate, said other end plate comprising a commutator for translating current with respect to said armature winding; and said field developing means including a low reluctance core rotatably mounted within said armature and rotatable with respect to said armature shell and with respect to said support.

References Cited

UNITED STATES PATENTS

| 440,016 | 11/1890 | Cleaver et al. | |
| 1,813,394 | 7/1931 | Fraser | 310—266 |
| 2,860,267 | 11/1958 | Hayes | 310—266 |

FOREIGN PATENTS

| 1,341,582 | 9/1962 | France. |
| 1,151,065 | 7/1963 | Germany. |
| 619,481 | 3/1949 | Great Britain. |
| 635,624 | 4/1950 | Great Britain. |

MILTON O. HIRSHFIELD, *Primary Examiner.*

J. J. SWARTZ, J. W. GIBBS, *Assistant Examiners.*